United States Patent Office 3,552,946
Patented Jan. 5, 1971

3,552,946
PREPARATION OF ALUMINUM POWDER
Gottfried J. Brendel, Baton Rouge, La., assignor to Ethyl Corporation, New York, N.Y., a corporation of Virginia
No Drawing. Continuation-in-part of application Ser. No. 718,956, Apr. 4, 1968, which is a continuation-in-part of application Ser. No. 390,225, Aug. 17, 1964. This application Sept. 2, 1969, Ser. No. 854,774
Int. Cl. B22f 9/00; C22b 21/00
U.S. Cl. 75—.5
6 Claims

ABSTRACT OF THE DISCLOSURE

Pure aluminum powder is prepared by pyrolyzing an amine alane such as the trimethylamine complex of aluminum hydride in solution.

---

This is a continuation-in-part of my prior copending application Ser. No. 718,956, now Pat. No. 3,479,382 filed Apr. 4, 1968, which in turn is a continuation of my still earlier application Ser. No. 390,225, filed Aug. 17, 1964, and now abandoned.

The present invention pertains to a process for the preparation of aluminum powder from amine alanes. More specifically, the present invention pertains to a novel process for the preparation of pure aluminum powder from tertiary amine aluminum hydride complexes.

Amine aluminum hydride complexes and methods for their preparation are known in the art, for example, as reported by E. Wiberg, H. Graf and R. Uson in their publication entitled "About Monomeric Aluminum Hydride $AlH_3$" Z. anorg. allegem. Chem. 272, 221–32 (1953), they can be obtained by conversion of ethereal solutions of aluminum chloride and lithium alanate to produce an ethereal $AlH_3$ solution to which is added a tertiary amine to prevent polymerization of the ether-soluble $AlH_3$ to ether-insoluble, solid, polymeric $(AlH_3)_x$. In this manner, stable ether-soluble aminates of the composition $AlH_3 \cdot NR_3$ and $AlH_3 \cdot 2NR_3$ are formed. The authors report that heating the compounds with a free flame leads to the formation of an aluminum mirror at the hot spots.

Pyrometallurgical processes whereby aluminum powder may be prepared have been extensively investigated. For example, after the discovery of practical processes by which aluminum alkyls could be prepared on an economical basis, Ziegler and his colleagues investigated the pyrolysis of aluminum alkyls as a means of preparing metallic aluminum. Although the initial indications [Ziegler and Gellert U.S. 2,843,474, granted July 15, 1958] were to the effect that aluminum of high purity might be achieved in this manner, subsequent detailed experimental evaluation of this pyrolysis process [Ziegler, Nagel and Pfohl, Ann. 629, 210–221 (1960)] showed that the pulverulent aluminum product contained an intolerable amount of aluminum carbide impurity.

In Canadian Pat. 645,138 issued July 17, 1962 to Tanaka, Yurimoto and Ryu, a process for producing high purity aluminum from branched chain aluminum alkyls such as triisobutyl aluminum and diisobutyl aluminum hydride is described. The pyrolysis of the aluminum alkyl is effected in a high boiling hydrocarbon medium. However, temperatures of 200–300° C. are required for the process. Also, as brought out by Ikeda, Yurimoto and Ryu in Canadian 682,947, issued Mar. 24, 1964, a considerably larger amount of the solvent is required than would be desired and this necessitates both the sizing of equipment to accommodate the volumes involved and the input of considerable amounts of thermal energy to effect the pyrolysis.

The process described by Ikeda et al. in Canadian 682,947 involves pyrolysis of various complexes of aluminum alkyls such as aluminum trialkyls and dialkyl aluminum hydrides. Even so, pyrolysis temperatures of at least 180° C. are required, the preferred temperatures ranging from about 200° C. to 250° C.

As pointed out by Tanaka, Yurimoto and Ryu in Canadian Patent 683,037, issued Mar. 24, 1964, the amount of aluminum carbide impurity in the aluminum product is closely related to the rate at which the alkyl aluminum compound or its complex is decomposed. Thus in that patent, the patentees describe a pyrolysis process whereby the rate of aluminum alkyl thermal decomposition is carefully regulated in order to minimize the amount of aluminum carbide contained in the isolated aluminum product. Besides requiring control of the rate of decomposition, the process requires temperatures above 180° C. The patentees state that it is desirable to keep the reaction temperature in a range from 200–300° C.

An object of this invention is to provide a novel process for the preparation of aluminum powder from amine alanes.

A more specific object of this invention is to provide a process for the preparation of pure aluminum powder from tertiary amine aluminum hydride complexes in a most expeditious manner.

Another object is to improve upon the prior art solution pyrolysis processes for producing aluminum powder by using an amine alane in lieu of an aluminum alkyl.

These and other objects will come to light as the discussion proceeds.

Pursuant to the present invention amine alanes such as the trimethylamine complex of aluminum hydride are used for preparing pure aluminum in the form of aluminum powder by solution pyrolysis. In one embodiment tertiary amine aluminum hydride complexes are pyrolyzed in solution in a non-oxidizing atmosphere, e.g., nitrogen, hydrogen, neon, argon, krypton, and the like. For example, pure aluminum powder is readily produced by solution pyrolysis of trimethylamine complex of aluminum hydride in a non-oxidizing atmosphere.

Preferred amine alane complexes for use in the instant invention are those containing lower alkyl groups viz, 1 to 6 carbon atoms per group, and especially those wherein the alkyl groups of the amine constitutent are the same. Examples of such complexes include the trimethylamine complex of aluminum hydride, the triethylamine complex of aluminum hydride, and the like. As indicated by Wiberg, Graf and Uson (op. cit.) the tertiary amine complexes of aluminum hydride are easily soluble in organic solvents and thus the formation of the solutions for use in the present pyrolysis process poses no problem.

The temperature of decomposition of the amine alane is generally less than about 150° C. For example, a trimethylamine alane is conveniently pyrolyzed at a temperature within the range of about 120° C. to about 150° C.

Among the advantageous features of the present process is its utmost simplicity. All that is required is to form or procure a solution of tertiary amine alane in a suitable organic solvent and subject the system to sufficient heat so as to raise its temperature to the pyrolysis temperature—i.e., the temperature at which the aluminum powder is formed at a suitable rate. Examples of solvents and particular details concerning the manner by which they are used in solution pyrolysis processes are reported for example in Canadian Pats. 645,138; 682,947; and 683,037, all disclosures of which are incorporated in this specification as if fully set forth herein.

Another advantage of this invention is that the pyrolysis occurs, and generally will be conducted, at temperatures significantly lower than those required for solution pyrolysis of alkyl aluminum compounds and their complexes. Hence, the process of this invention has significantly lower heat energy requirements than the prior art aluminum alkyl solution pyrolysis processes. By way of example, the trimethylamine complex of aluminum hydride when dissolved in n-decane or mesitylene is pyrolyzed at a convenient rate at temperatures over the range of 120 to 150° C. On the other hand, aluminum alkyls require temperatures of at least 180° C., temperatures above 200° C. usually being required in order to produce the metal at an acceptable rate.

A further advantage of this invention is that unlike the situation described by Tanaka, Yurimoto and Ryu in Canadian Pat. 683,037, high purity aluminum powder can be produced in the process of this invention irrespective of the decomposition rate. Thus, the process of this invention does not require close regulation among temperature, rate of feed to the pyrolysis reactor, and rate of generation of decomposition gas. In other words, the rate of decomposition may be varied without impairing the high purity of the aluminum product. In contrast, the data reported by Ikeda et al. indicate that unless the thermal decomposition of aluminum alkyls is conducted at a sufficiently rapid rate an excessive amount of aluminum carbide impurity will be found in the aluminum product.

A still further advantage of the process of this invention is that unlike the decomposition of aluminum alkyls, the gaseous coproducts from pyrolysis of the amine alanes are unreactive toward each other at the conditions under which they are released. For example, the gaseous coproducts of the present process when using trimethylamine alane are trimethylamine and hydrogen, materials which do not interact at the temperatures employed. In contrast, thermal decomposition of aluminum alkyls results in the liberation of olefin and hydrogen. As brought out in U.S. 2,843,474 and as indicated in the data presented in Canadian 645,138 and 682,947, some of the liberated olefins tends to be hydrogenated and this results in a loss of both olefin and hydrogen.

I claim:
1. A process for preparing pure aluminum powder, which comprises pyrolyzing an amine alane in solution in an organic solvent, in a non-oxidizing atmosphere, to a temperature less than about 150° C.
2. The process of claim 1 wherein the amine alane is trimethylamine alane.
3. The process of claim 1, wherein the amine alane is triethylamine alane.
4. The process of claim 1, wherein the amine alane is an amine complex of aluminum hydride having alkyl groups containing from 1 to 6 carbon atoms per alkyl group.
5. The process of claim 1, wherein the organic solvent is n-decane.
6. The process of claim 1, wherein the rate of decomposition may be varied without substantially impairing the high purity of the aluminum product.

References Cited
UNITED STATES PATENTS 3,154,407 10/1964 Ikeda et al. _____ 75—68
3,375,129 3/1968 Carley et al. _____ 117—107.2

L. DEWAYNE RUTLEDGE, Primary Examiner

W. W. STALLARD, Assistant Examiner

U.S. Cl. X.R.

75—68